April 23, 1929.  D. R. LOVEJOY  1,710,328
TIME RECORDER FOR LOCKS
Filed March 18, 1926   3 Sheets-Sheet 1
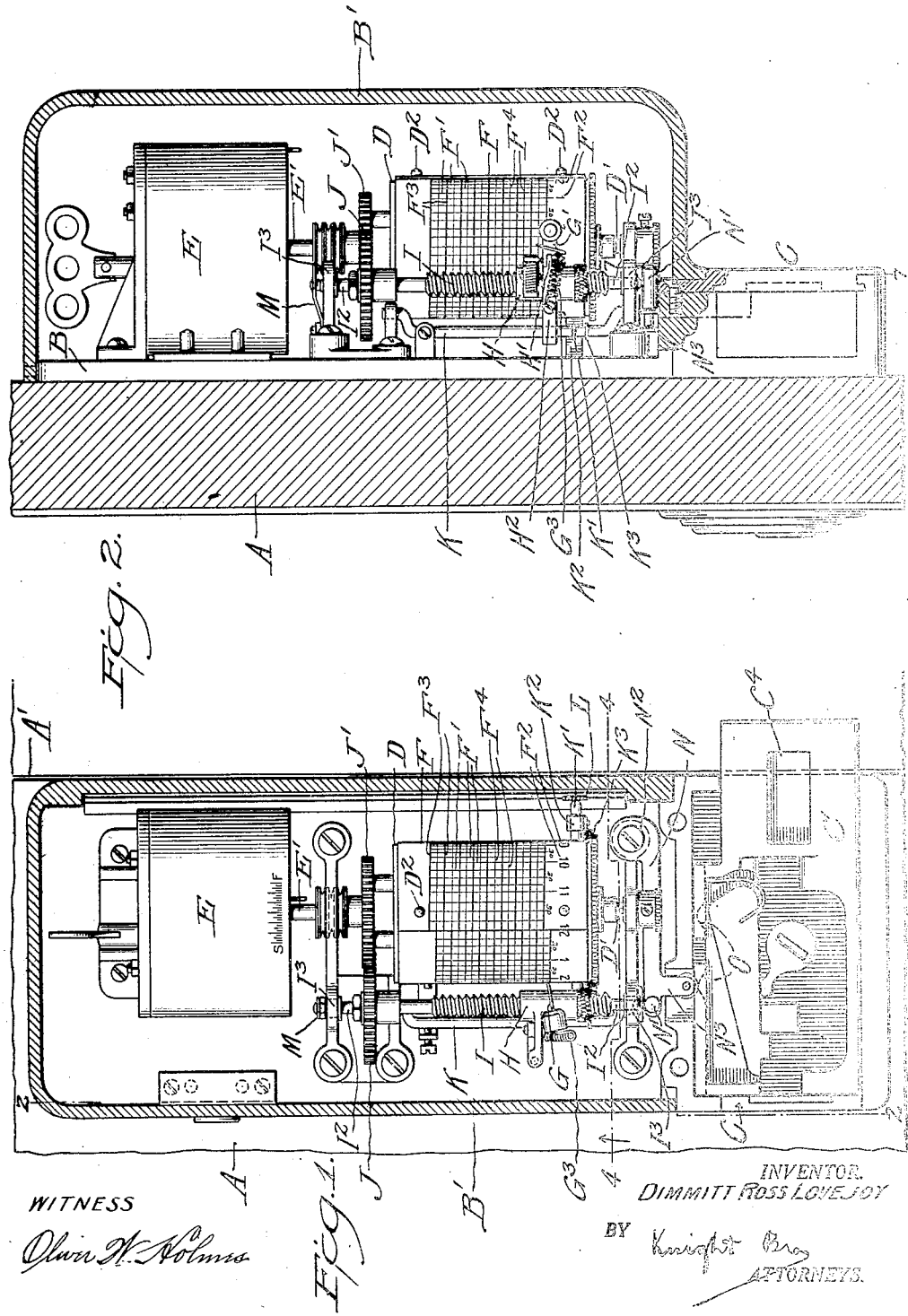
WITNESS
INVENTOR.
DIMMITT ROSS LOVEJOY
BY
ATTORNEYS.

April 23, 1929.　　　D. R. LOVEJOY　　　1,710,228
TIME RECORDER FOR LOCKS
Filed March 18, 1926　　3 Sheets-Sheet 2
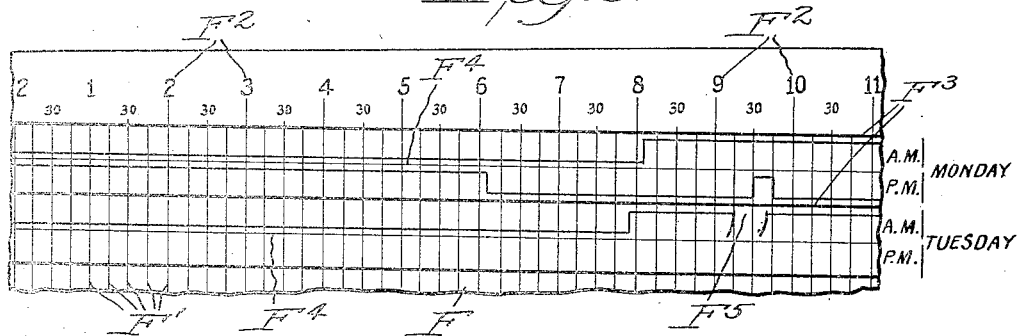
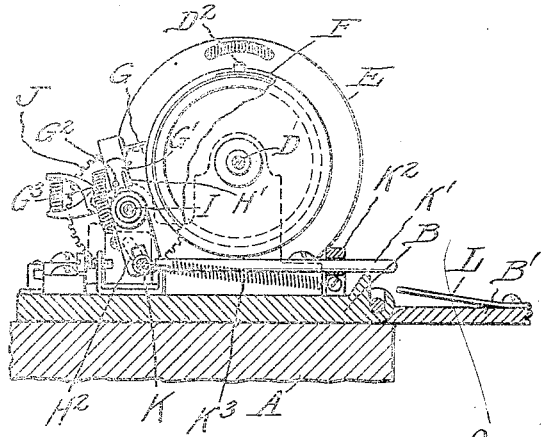
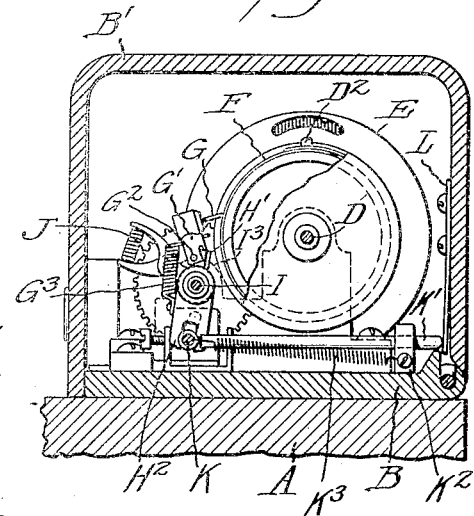
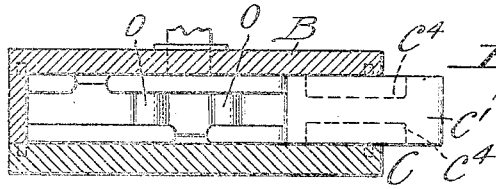
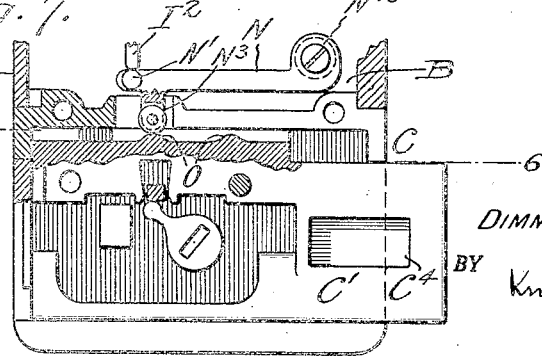
WITNESS
INVENTOR.
DIMMITT ROSS LOVEJOY
BY
ATTORNEYS.

April 23, 1929.  D. R. LOVEJOY  1,710,228
TIME RECORDER FOR LOCKS
Filed March 18, 1926  3 Sheets-Sheet 3
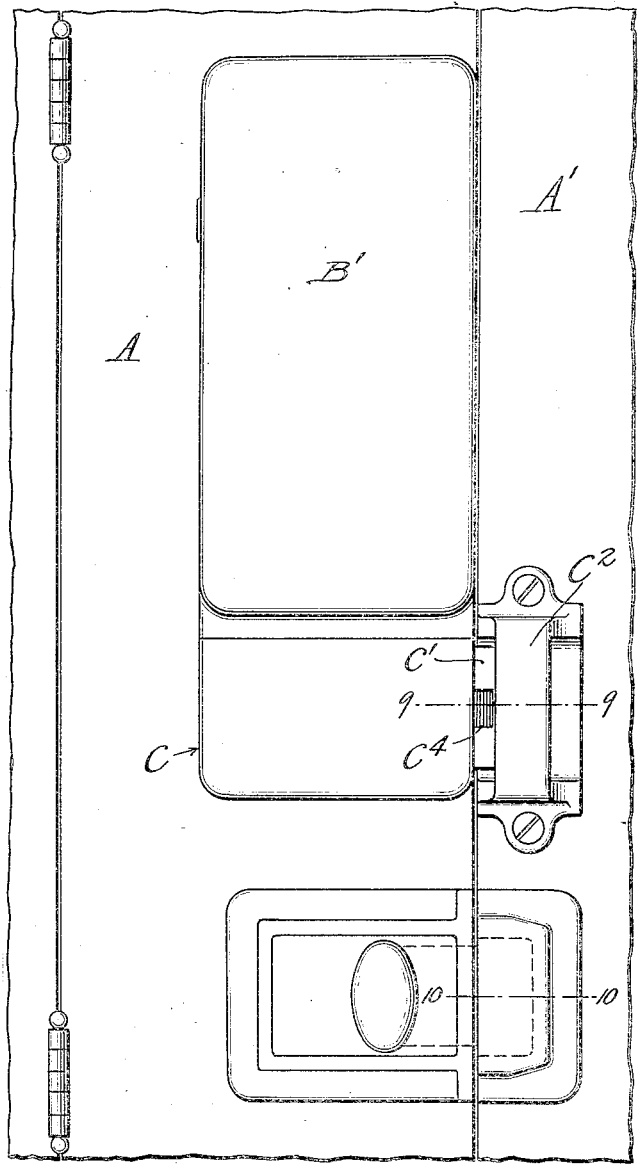
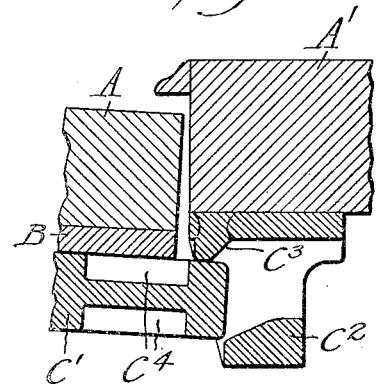
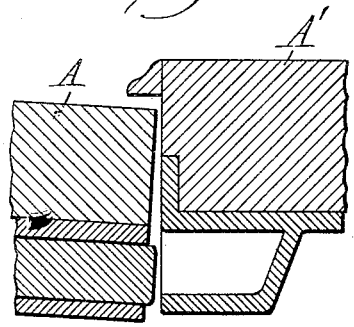
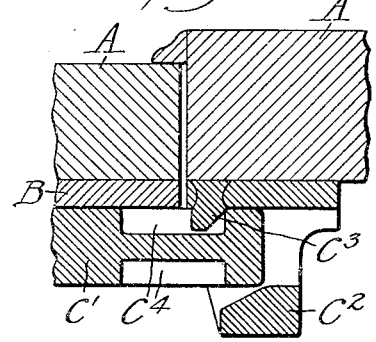
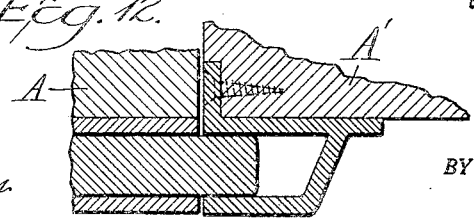
INVENTOR.
DIMMITT ROSS LOVEJOY
BY Knight Bros
ATTORNEYS.

Patented Apr. 23, 1929.

1,710,228

UNITED STATES PATENT OFFICE.

DIMMITT ROSS LOVEJOY, OF NEW YORK, N. Y.

TIME RECORDER FOR LOCKS.

Application filed March 18, 1926. Serial No. 95,638.

The object of the invention is to provide a recorder arranged to produce a permanent record of the opening and closing of the lock for any given period of time and in such a manner that tampering with the lock during this period is recorded.

In order to accomplish the desired result, use is made of a clock-driven drum containing a record sheet, a stylus mounted adjacent to the said drum and adapted to mark on said record sheet, actuating means for the stylus controlled by a movable member of the lock so that the stylus makes a check mark, indicating opening and closing of the lock, and a line approximately at right angles to the said opening and closing check marks to indicate the period of time between the opening and closing check marks and at the same time by its continuity or lack of continuity to indicate whether the case protecting the record chart has not or has been opened. It will also record the time at which the protecting case has been opened and how long it remained open.

In carrying out my invention I may, for example, employ a special form of lock, as described in United States Letters Patent Nos. 1,099,738; 1,281,536 and 1,295,450.

In such locks, the recording lock and a primary or ordinary lock are applied to the same door, with appropriate keepers, the keeper of the recording lock being provided with means, such as a pin or stop, in position to engage the bolt of the recording lock when the latter is unlocked, thereby retaining the door in such a position that the bolt of the primary lock cannot be locked until the bolt of the recording lock is locked, and whereby the bolt of the recording lock cannot be unlocked while the bolt of the primary lock is locked.

It is desirable to not only record the time the door is locked or unlocked, but also the time the case enclosing the recording means is open or closed. This case is opened at regular intervals by a duly accredited inspector for removing the record slip and rewinding the clock. It might also be opened by an unauthorized person.

My present invention provides means for making a continuous record not only of the locking and unlocking of the door, but also of the opening and closing of the record case.

Referring to the accompanying drawings:
Figure 1 is a front elevation of the time recorder for locks as applied, and with the casing in section.

Figure 2 is a cross section of the same on the line 2—2 of Figure 1.

Figure 3 is an enlarged face view of a portion of the record sheet.

Figure 4 is an inverted sectional plan view of the time lock on the line 4—4 of Figure 1, and with the parts in position when the enclosing case is open.

Figure 5 is a similar view of the same with the parts in position when the enclosing case is closed.

Figure 6 is a sectional plan view of the lock bolt on the line 6—6 of Figure 7, and with the parts in position when the door is unlocked.

Figure 7 is a sectional elevation on the line 7—7 of Figure 2 of the same, with the parts in position when the door is unlocked.

Figure 8 is a front elevation of a door and jamb with a primary lock and keeper and a time recording lock and keeper applied to it.

Figure 9 is a sectional plan view through the line 9—9 of Figure 8, when both locks are unlocked.

Figure 10 is a sectional plan view of the primary lock and keeper through the line 10—10 of Figure 8, when both locks are unlocked.

Figure 11 is the same view as Figure 9, except that the time recording lock is locked; and Figure 12 is the same view as Figure 10 except that both locks are locked.

On the door A is secured a casing or other support B for the autograph time recorded, and on the said support B is mounted a locking device C of any approved construction, and preferably provided with a key-controlled bolt C' adapted to engage a keeper C² on the door casing A' to lock the door A in closed position. On the support B is journaled the shaft D' of a vertically disposed drum D having the upper end of its shaft D' coupled to a driven shaft E' of a clockwork E of any approved construction and likewise mounted on the support B. On the peripheral face of the drum D is removably held a record sheet F by the use of suitable pins D². The record sheet F is provided with vertical lines F' spaced equal distances apart and representing hours and subdivisions, the numerals F² indicating the hours being marked on the corresponding hour lines, preferably at the top thereof. As shown, the record sheet indicates twelve hours and the clockwork E rotates the drum D once every twelve hours. The record sheet F is further provided with a spiral line $F^3$, the convolutions of which correspond to those of the screw rod I, which makes one revolution to every revolution of the drum D, so that at each revolution of the screw rod I, the stylus G travels a distance corresponding to that between adjacent convolutions of the spiral line $F^3$. In practice, the stylus is set to mark in the space between adjacent convolutions of the spiral line $F^3$. In order to indicate A. M. and P. M. the spiral line is heavy for one convolution and light for the next following convolution, indicated by $F^4$ as will be readily understood by reference to the drawings. As shown, the record sheet is arranged for obtaining eight days' record of the opening and closing of the locking device C.

On the record sheet F is applied the stylus G provided with a shank G' fulcrumed at $G^2$ on a lug H' attached to or forming part of a nut H screwing on a screw rod I arranged parallel to the axis of the drum D and journalled in bearings on the support B. The upper end of the screw rod I is provided with a gear wheel J in mesh with a gear wheel J' secured to the top of the drum D so that when the latter is rotated by the clockwork E then a like rotary motion is given to the screw rod I to move the nut H and consequently the stylus G lengthwise of the drum D and the record sheet F. The pivot $G^2$ for the stylus arm G' is arranged at an angle to the axis of the drum D so that the stylus G swings relatively to the face of the record sheet F, as will be readily understood by reference to Figures 4 and 5. The swinging movement of the stylus G on the lug H' and in a direction toward the record sheet F is limited, and the back of the stylus shank G' is pressed on by a spring $G^3$ secured to an arm $H^2$ projecting rearwardly from the nut H. The rear end of the arm $H^2$ is forked and engages a rock arm K journaled on the support B and extending the length of the drum D, and the lower end of the said rock arm K is engaged by a push rod K' held in alignment by a sleeve $K^2$. The push rod K' is engaged by a push spring L attached to the hinged cover B'. Rock arm K is attached to retractile spring $K^3$ which moves it and push rod K' to the right when the cover B' is opened. The movement of rock arm K acting between the forks of the rear end of the arm $H^2$ rotates the nut H around the worm shaft I, raising the stylus G from the chart F and interrupting the record line as shown at $F^5$ while the cover B' remains open. Closing cover B' presses push rod K' to the left and carries through the same cycle of operations in reverse order so that stylus G is applied to chart F and the interrupted record line is begun again. The open space between the portions of the line, as at $F^5$ indicates the period during which the cover B' was open.

The screw shaft I is provided with cylindrical portions $I^2$ at each end which are loose in the journals $I^3$. The shaft I is pressed downward by the force of gravity and by the leaf spring M and at the bottom bears upon the extension N' of the lever N which is journaled at $N^2$ and is provided with a downwardly extending portion $N^3$ bearing upon the top of the bolt C'.

The bolt C' is provided with bosses O spaced so that when the bolt is in the unlocked position, the lever N will be raised up by resting on the boss and will raise the shaft I so that stylus G will record the time of opening by a vertical mark and will continue to record that the lock remains unlocked by keeping the record line close to the upper portion of the allotted space. Conversely when the bolt C is shot, the same cycle is repeated in reverse order and the vertical mark indicates the time of locking and continues to record that it remained locked by maintaining the record line close to the lower portion of the allotted space.

Referring to Figure 3, the chart indicates that the recording time lock was unlocked at approximately 8.05 A. M. on Monday, remained unlocked until 6.05 P. M. when it was locked, was unlocked at 9.30 P. M. and locked again at 9.45 P. M. On Tuesday it was unlocked at 7.55 A. M. The chart case cover was opened at 9.15 A. M. and closed at about 9.40 A. M.

Two bosses O are shown on top of bolt C' so that it can be used either on a left hand or a right hand door by changing the removable bolt shutter from one side to the other and reversing the bolt C' so that it points in the opposite direction.

The cooperation between the time recording lock and the primary lock is accomplished by equipping the keeper $C^2$ of the recording lock with a hard steel pin $C^3$ which strikes the end of the bolt C' when it is in the unlocked position as shown in Figure 9. This prevents the door from completely closing and as the bolt of the primary lock is thus held out of line with the recess of its keeper as shown in Figure 10, the bolt of the primary lock cannot be shot.

When the bolt of the time recording lock is shot to simultaneously make a closing record and lock the door, the pin $C^3$ enters the recess $C^4$ in the bolt C', permitting the door A to completely close as shown in Figure 11 and the bolt of the primary lock to come in line with the recess of its keeper, permitting the bolt to be shot as shown in Figure 12.

To open the door the primary lock must first be unlocked. This permits the door to swing slightly open as the time recording lock is unlocked and the bolt C' to disengage from the pin C³ and be withdrawn simultaneously, making an opening record on the record chart, through the correlated action of the various parts.

From the above description it will be seen that I have described a combination involving a time recording lock and an ordinary lock with means for making a permanent record not only of the time the door was locked and unlocked but also of the time the time mechanism was uncovered whether such uncovering was done by unauthorized tampering or for the usual attention of the authorized agent.

I claim:—

1. Apparatus of the character described comprising in combination means for locking and unlocking a door, means controlled by said locking and unlocking means for making a record of the time when the door is locked and the time when the door is unlocked, means normally rendering said record inaccessible but adapted to be operated to gain access to the record, and means controlled by the operation of said last named means to record the time when the record is accessible.

2. A recording lock for doors comprising in combination a bolt for locking a door, means for making a record of the position of the bolt, a closure normally maintaining the record inaccessible but adapted to be opened for giving access thereto, and means for making a record of the opening of said closure.

DIMMITT ROSS LOVEJOY.

DISCLAIMER 1,710,228.—*Dimmitt Ross Lovejoy*, New York, N. Y. TIME RECORDER FOR LOCKS. Patent dated Apr. 23, 1929. Disclaimer filed July 19, 1935, by the assignee, *The Silent Watchman Corporation*.

Hereby enters this disclaimer to the claims of said patent as follows:

(*a*) From claim 1 of said patent any apparatus of the character described, in which the means that notes on the record the time when the record is accessible makes the same notation as that made by the means for recording the time when the door is locked or the time when the door is unlocked.

(*b*) From claim 2 of said patent any recording lock for doors in which the means that notes on the record the opening of said closure makes the same notation as that which is made by the means for making a record of the position of the bolt.

[*Official Gazette August 6, 1935.*]